UNITED STATES PATENT OFFICE.

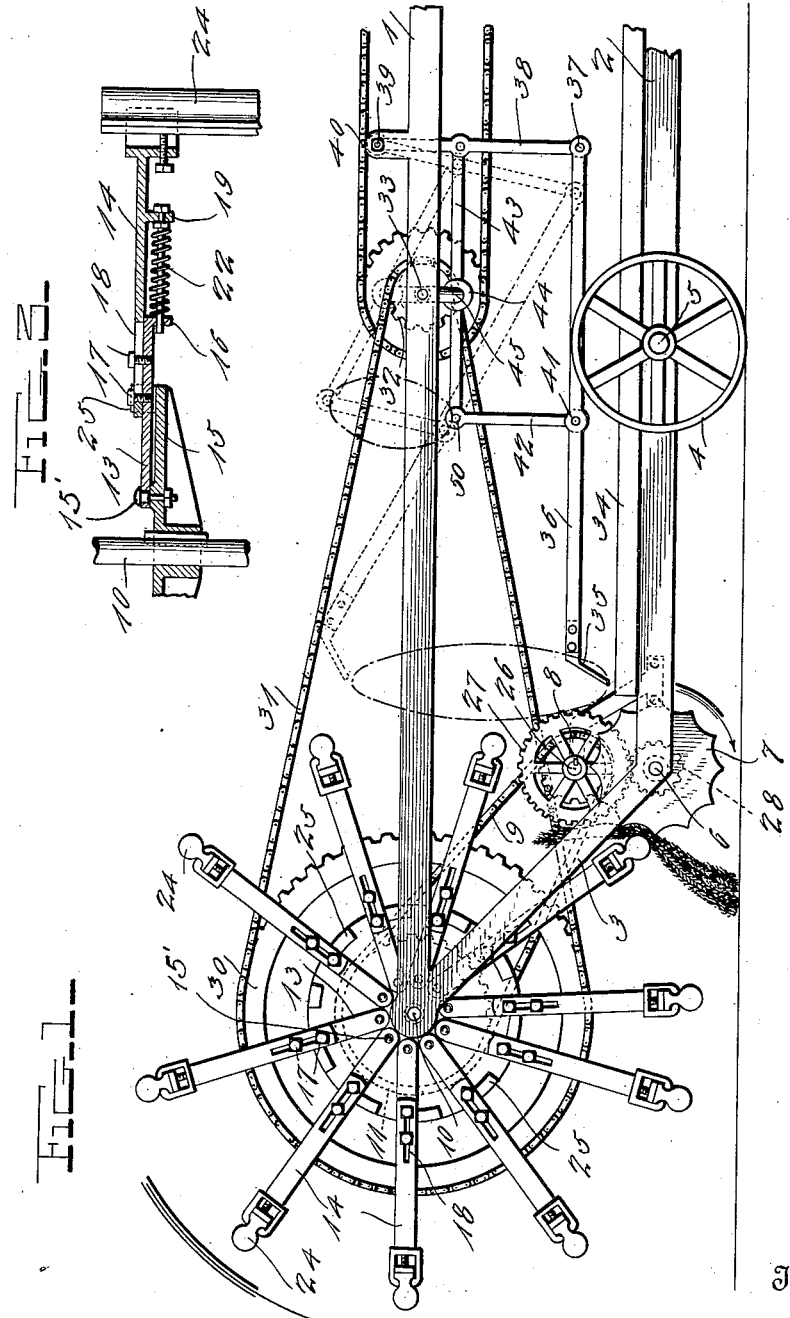

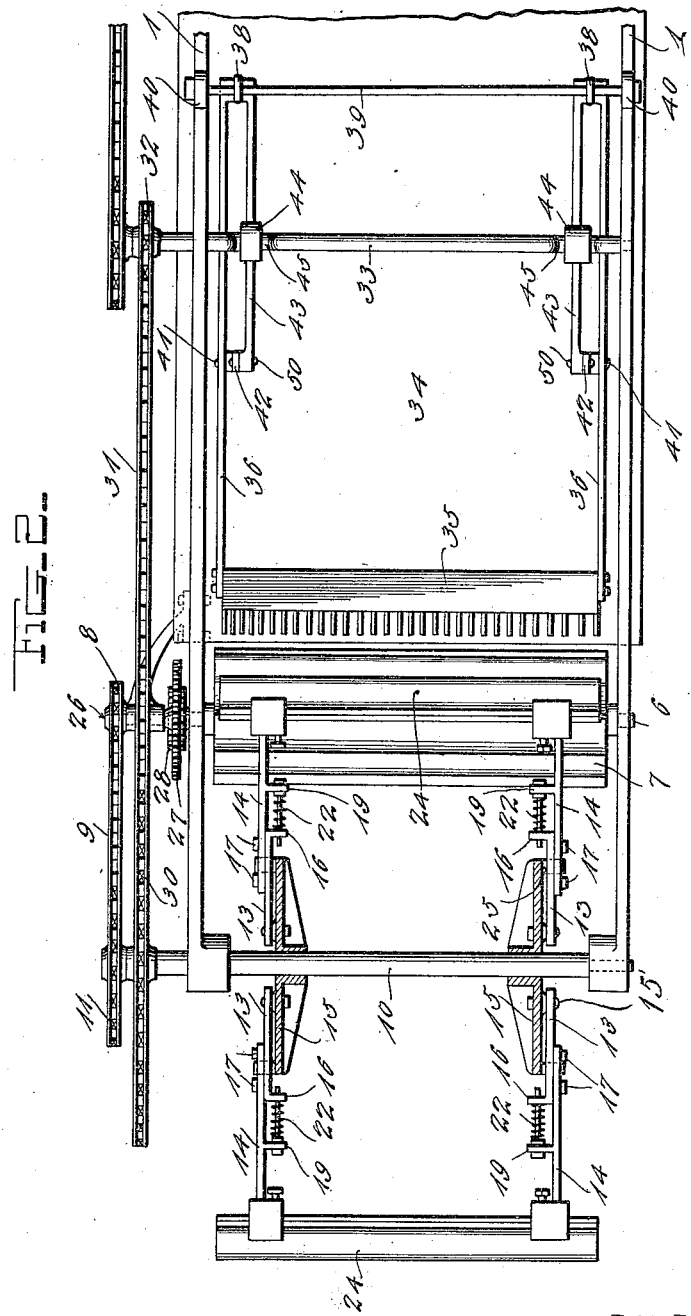

JOSEPH A. LUSSIER, OF MINNEAPOLIS, MINNESOTA.

FLAX-PULLER.

1,087,309.  Specification of Letters Patent.  Patented Feb. 17, 1914.

Application filed April 25, 1912. Serial No. 693,136.

*To all whom it may concern:*

Be it known that I, JOSEPH A. LUSSIER, a citizen of the United States, residing at Minneapolis, in the county of Hennepin and State of Minnesota, have invented certain new and useful Improvements in Flax-Pullers; and I do declare the following to be a full, clear, and exact description of the invention, such as will enable others skilled in the art to which it appertains to make and use the same.

This invention relates to harvesters and more especially to self rakers; and the object of the same is to produce an improved flax puller which will include certain improvements over my former patent on this subject, dated July 30, 1907, and numbered 861,376.

To this end the invention consists in adding to the device shown in that patent a raking mechanism whereby the flax plants when pulled are raked over a platform.

The present invention also contemplates driving the drum at a higher speed than the reel, and hence the provision of movable and flexible arms on the latter so that their cushions may coact with the flutes in the rapidly moving drum.

These and other objects are carried out by the construction hereinafter more fully described and claimed, and as shown in the drawings wherein—

Figure 1 is a side elevation of the machine complete; Fig. 2 is a plan view with the reel in section; and Fig. 3 is an enlarged sectional detail showing the sliding connection between the inner and outer members of the reel-arm.

As shown in the drawings the frame comprises two substantially parallel members 1 and 2, connected by an oblique brace 3 and supported on traction wheels 4 journaled at 5 on the frame. Journaled in the latter is a shaft 6 carrying a fluted drum or pulling cylinder 7, and driving a sprocket wheel 8 from which leads a chain belt 9 to another sprocket wheel 11 on the shaft 10 of which is mounted the reel. The latter includes disks 15 and radial arms made in two members whereof the innermost numbered 13 are connected with the shaft 10 and with the disks in a manner to be described below and are provided at their outer ends with offset ears 16, while the outermost members 14 have slots 18 through which project screws in the other members so that they may move thereon. The outer ends of the outer members are connected in pairs by transverse slats carrying rubber cushions 24 adapted to engage the corrugations in the drum 7, and expansive springs 22 interposed between ears 19 on members 14 and those projecting outwardly from the inner members 13, press said cushions normally outward with yielding force. This much of my invention follows closely the construction in my former patent above referred to, and no novelty is claimed therefor.

Coming now more particularly to the details of the present invention, each disk 15 is provided around its periphery with spaced lugs 25 between which the arms project loosely, and said arms are by preference made of strap iron pivoted at 15′ to the disk near the shaft 10. It follows that, as the arms are set on edge or in a plane at right angles to the axis as seen in Fig. 2, each may flex in a plane extending longitudinally through such axis; but after each cushion passes into one of the flutes or grooves within the surface of the drum, its arms may move as far as permitted by the spaces between the lugs 25 in the disks 15 to permit their cushion to remain within the groove in the drum as the latter turns to draw the flax out of the ground. It may be necessary as seen in Fig. 1 to interpose between the sprocket 8 and the shaft 6 a counter shaft 26 carrying the sprocket gear 8 and itself connected by gearing 27 and 28 with the shaft 6; but any suitable means may be provided for transmitting motion from the shaft 6 to the shaft 10 and causing these two shafts to rotate at the proper relative speed. I might here add that instead of the arrangement of belts and sprockets described below and shown in the drawings, any other arrangement could be adopted which would be satisfactory, or belts and sprockets might be entirely dispensed with as the construction shown is merely for sake of illustration. Bearing this fact in mind, the shaft 10 may carry a large sprocket gear 30 from which a sprocket chain 31 leads to a smaller sprocket gear 32 on a crank shaft 33 mounted in suitable bearings above a platform 34 which is carried by the frame of the machine, and over this platform moves the rake which constitutes the second feature of this improvement herein.

The rake head 35 is carried at the extremities of two long arms 36, whose other ends are pivoted at 37 to the lower extremities of two long upright levers 38, the latter being pivotally supported at 39 in standards 40 rising from the platform. Pivoted at 41 to said arms 36 about mid-way of their length are short links 42, and the upper ends of the latter are pivotally connected with the central portions of the levers 38 by connecting levers 43 which have bearings 44 between their ends journaled on the cranks 45 of the shaft 33. From this construction it follows that when the shaft rotates its cranks carry with them the points 44 in the connecting levers 43, and as one end of the latter has a swinging motion under the pivot 39 of the levers 38, the other end pivotally connected at 50 with the upper extremities of the links 42 must move through the path indicated by the dotted oval. Similarly, while the inner ends of the arms 36 have a swinging support at the points 37 and their centers 41 are connected with the points 50 by the links 42, their other ends carrying the rake head 35 must move through the dotted path so that the tines of the rake are caused to rise and recede, then descend toward and coact with the platform, and then move over the same to draw upon the plants which are pulled by the coactive relation of the drum and reel. I find this second feature of improvement of great advantage in a flax puller of this character, for it draws the plants away from the picking mechanism and permits the latter to work much more rapidly and hence the machine is more rapidly advanced over the ground and the work more rapidly accomplished. Moreover the present improvement draws each plant over the drum and onto the platform before the top of the next plant is grasped, and therefore the roots of one plant are not mixed with the top of the next and the plants as a whole are delivered to the platform in much better condition. It will not be necessary for the purposes of this specification to amplify what occurs to the plants so delivered onto the platform; and the details of construction—as suggested above—may be changed to a considerable extent, if desired, without departing from the spirit of the present invention. Power may be led from a suitable source to any of the shafts described, and it will not be necessary to illustrate this detail.

What is claimed as new is:

1. The combination with a fluted pulling drum; of a reel comprising a shaft whose axis is parallel with that of the drum, disks carried by said shaft and having spaced lugs around their peripheries, arms movably connected at their inner ends with said disks and passing loosely between said lugs, cushions at the outer ends of the arms adapted to be engaged by the flutes of said drum, and means for rotating the latter oppositely to and faster than the reel.

2. The combination with a fluted pulling drum mounted on a shaft, a reel shaft parallel therewith, and connections between the shafts for driving the drum shaft opposite to and faster than that of the reel; of disks mounted on the reel shaft and having spaced lugs around their peripheries, radial arms connected at their inner ends with this shaft and passing loosely through said spaces, and cushions connecting their outer extremities in pairs and adapted to be engaged by the flutes of said drum.

3. The combination with a fluted pulling drum mounted on a shaft, a reel shaft parallel therewith, and means for driving the drum shaft oppositely to and faster than the reel shaft; of a pair of disks mounted rigidly on the reel shaft and having spaced lugs around their peripheries, a series of strap-iron arms pivoted at their ends to the outer face of each disk and passing loosely between a pair of said lugs, each arm being in two members having their meeting ends overlapping and slidably mounted on each other, means for distending the outer member radially of the reel with yielding force, said member projecting beyond the disk whereby it may yield in a plane through the axis of the drum, and cushions parallel with said axis and connecting the outer ends of the outer members in pairs and adapted to engage the flutes in said drum.

In testimony whereof I have hereunto set my hand in presence of two subscribing witnesses.

JOSEPH A. LUSSIER.

Witnesses:
GEO. E. YOUNG,
AURELIA BENNETT.